United States Patent [19]

Sugiura et al.

[11] 4,388,445

[45] Jun. 14, 1983

[54] HEAT-CURABLE COATING COMPOSITION

[75] Inventors: Shinji Sugiura; Kyoichi Horibe, both of Hiratsuka, Japan

[73] Assignee: Kansai Paint Co., Ltd., Hyogo, Japan

[21] Appl. No.: 341,154

[22] Filed: Jan. 19, 1982

[30] Foreign Application Priority Data

Jan. 23, 1981 [JP] Japan ................................ 56-7819

[51] Int. Cl.³ .............................................. C08F 8/00
[52] U.S. Cl. .................... 525/124; 525/162; 525/166; 525/170; 525/176
[58] Field of Search ............... 525/124, 162, 166, 170, 525/176

[56] References Cited

U.S. PATENT DOCUMENTS

| | | | |
|---|---|---|---|
| 3,382,294 | 5/1968 | Christenson | 525/162 |
| 4,071,578 | 1/1978 | Lasher | 525/170 |
| 4,076,766 | 2/1978 | Simms | 525/170 |
| 4,291,135 | 9/1981 | Hohlein | 525/101 |

FOREIGN PATENT DOCUMENTS 48-60143 8/1973 Japan ................................ 525/124

*Primary Examiner*—Allan Lieberman
*Assistant Examiner*—Patricia Short
*Attorney, Agent, or Firm*—Wenderoth, Lind & Ponack

[57] ABSTRACT

A heat-curable coating composition comprising as a binder (A) an oil-free polyester in which at least 30 mole % of the acid component consists of a saturated alicyclic polybasic acid, said polyester having a composition on or within the four sides of a tetragon defined by four points of (0.8, 60), (0.8, 100), (1.00, 70) and (1.00, 100), on coordinates in which the abscissa represents the molar ratio of the polybasic acids to the polyhydric alcohols (dibasic acid ratio) and the ordinate represents the proportion in mole % of a glycol having at least 3 carbon atoms in the polyhydric alcohols, (B) an alkyd resin having an oil length of 15 to 50% and a hydroxyl value of 40 to 200, (C) a hydroxyl-containing acrylic resin having a hydroxyl value of 20 to 200 and a number average molecular weight of 1,000 to 30,000, and (D) a crosslinking agent.

9 Claims, No Drawings

HEAT-CURABLE COATING COMPOSITION

BACKGROUND OF THE INVENTION

1. Field of the Invention

This invention relates to a heat-curable coating composition, and more specifically, to a heat-curable coating composition comprising an oil-free polyester, an alkyd resin, an acrylic resin and a crosslinking agent as binder components.

2. Description of the Prior Art

Heretofore, alkyd resin paints, acrylic resin paints and oil-free polyester paints have typically been used as heat-curable paints. These three types of paints have advantageous characteristics peculiar to the respective resins, but are not without defects.

The alkyd resin-type heat-curable paints have the advantage that they do not easily undergo popping (a pinhole-like paint film imperfection caused by solvent evaporation during baking or inclusion of bubbles during coating) and sagging (a trace of the flowing of a paint on a substrate after application which remains on the coated film after baking), and have excellent appearance (the superior gloss and high build of paint films), solvent resistance and chemical resistance. On the other hand, they have inferior weatherability (resulting in reduced gloss). Furthermore, a coated film of a deep color series obtained from the alkyd resin paint containing a large amount of a colored pigment excepting white pigments has poor resistance to waxing so that when such a coated film is waxed, the surface of the film tends to be scratched or develop hazy gloss, and the wax used in waxing is markedly colored. The waxing resistance is the property required of both a coated film immediately after coating and a coated film after outdoor exposure. It is a very important property because in an ordinary coating line, dirt and dust adhering to the coated surface are removed by wiping it with a wax, and the top coatings of automobile bodies are frequently waxed during use. It is difficult for the alkyd resin-type heat-curable paints to give a coated film having satisfactory waxing resistance, both before and after exposure, and a high level of weatherability (gloss retention).

The acrylic resin-type heat-curable paints have excellent weatherability, water resistance and chemical resistance, but have the defect that the appearance of the coated film (high build and smoothness), the mechanical properties (Erichsen test and impact resistance) of the coated film and the dispersibility of pigments are poor.

The oil-free polyester-type heat-curable paints have excellent weatherability, waxing resistance, mechanical properties, adhesion to a primer, and interlayer adhesion (adhesion between layers when a baked coated film is coated again with the same paint and the repainted film is baked), but have the defect that popping or sagging tends to occur during coating, and the dispersibility of a pigment is poor.

Attempts to obtain a heat-curable coating composition having only the advantageous characteristics of these resins by using two or more of these resins in combination have been unsuccessful because the alkyd resins, acrylic resins and oil-free polyester resins generally have poor compatibility with each other.

SUMMARY OF THE INVENTION

We have made extensive investigations in order to solve this problem, and found that an oil-free polyester containing a specified amount of a saturated alicyclic polybasic acid as an acid component and having a relatively linear skeleton has excellent compatibility with acrylic and alkyd resins, and surprisingly, when this oil-free polyester is mixed with an alkyd resin and an acrylic resin, the compatibility between the three components is much higher than that between any two of these components, and consequently, a very useful heat-curable coating composition having only the advantageous characteristics of the three resins can be obtained.

Thus, according to this invention, there is provided a heat-curable coating composition comprising as a binder (A) an oil-free polyester in which at least 30 mole% of the acid component consists of a saturated alicyclic polybasic acid, said polyester having a composition on or within the four sides of a tetragon defined by the four points of (0.8, 60), (0.8, 100), (1.00, 70) and (1.00, 100), on coordinates in which the abscissa represents the molar ratio of the polybasic acid component to the polyhydric alcohol component of the polyester (dibasic acid ratio), and the ordinate represents the proportion in mole% of a glycol having at least 3 carbon atoms in the polyhydric alcohol component, (B) an alkyd resin having an oil length of 15 to 50% and a hydroxyl value of 40 to 200, (C) a hydroxyl-containing acrylic resin having a hydroxyl value of 20 to 200 and a number average molecular weight of 1,000 to 30,000, and (D) a crosslinking agent.

DETAILED DESCRIPTION OF THE INVENTION

The oil-free polyester (A) used in this invention is characteristic in that at least 30 mole%, preferably at least 40 mole%, of the acid component consists of a saturated alicyclic polybasic acid, and the polyester has the composition existing on or within the four sides of a tetragon defined by four points of (0.8, 60), (0.8, 100), (1.00, 70) and (1.00, 100), on coordinates in which the abscissa represents the molar ratio of the polybasic acids to the polyhydric alcohols (dibasic acid ratio) and the ordinate represents the proportion in mole% of a glycol having at least 3 carbon atoms in the polyhydric alcohols.

Examples of the saturated alicyclic polybasic acid as the acid component forming the oil-free polyester used in this invention include hexahydrophthalic acid and its anhydride, methylhexahydrophthalic acid and its anhydride, hexahydrotrimellitic acid and its anhydride, and hexahydro-2-methyltrimellitic acid and its anhydride. Examples of other polybasic acids are aromatic polybasic acids such as phthalic acid and its anhydride, isophthalic acid, dimethyl isophthalate, terephthalic acid, dimethyl terephthalate, trimellitic acid and its anhydride, 2-methyltrimellitic acid and its anhydride, and pyromellitic acid and its anhydride; saturated dibasic acids of the formula $HOOC(CH_2)_nCOOH$ in which n is an integer of 1 to 12, such as adipic acid, sebacic acid, azelaic acid and dodecanedioic acid; and unsaturated polybasic acids such as tetrahydrophthalic anhydride, methylcyclohexane tricarboxylic acid, maleic acid and maleic anhydride. When an unsaturated polybasic acid is used as a part of the acid component, its amount should be limited, for example to not more than 10 mole% because in applications where weatherability is important, the unsaturated bond in the molecules of the unsaturated polybasic acid degrades the weatherability of the coated film.

If the proportion of the saturated alicyclic polybasic acid in the acid component is less than 30 mole%, the resulting oil-free polyester has poor compatibility with alkyd resins and acrylic resins.

The polyhydric alcohol component of the oil-free polyester may include polyhydric alcohols conventionally used to form polyesters. They include, for example, glycols such as dihydric alcohols having two carbon atoms (e.g., ethylene glycol) and dihydric alcohols having at least three carbon atoms (e.g., diethylene glycol, propylene glycol, neopentyl glycol, 1,2-butylene glycol, 1,3-butylene glycol, 2,3-butylene glycol, 1,4-butylene glycol, 1,5-pentanediol, 1,6-hexanediol, 2,5-hexanediol, Ester Diol 204 (a tradename for a 2,2-dimethyl-3-hydroxypropyl 2,2-dimethyl-3-hydroxypropionate of Union Carbide Corporation) 2,2,4-trimethyl-1,3-pentanediol, tricyclodecane dimethanol (5.2, 1.0, 2.6), 1,4-cyclohexane dimethanol and dimethylol propionic acid); and trihydric or higher alcohols such as trimethylolethane, trimethylolpropane, glycerol, pentaerythritol, dipentaerythritol, diglycerol, sorbitol and tris(2-hydroxyethyl)isocyanurate.

The oil-free polyester can be produced in a customary manner by polycondensing the saturated alicyclic polybasic acid, optionally in combination with an aromatic polybasic acid, a saturated dibasic acid, etc., with at least one of the alcohols exemplified above. In this reaction, an end-blocking agent such as benzoic acid, p-t-butylbenzoic acid or methyl benzoate, may be used to adjust the molecular weight of the polyester. The ratio between the polybasic acid component and the alcohol component to be reacted are adjusted so that the polyester has the composition existing on or within the four sides of a tetragon defined by the four points described above on coordinates in which the dibasic acid ratio is plotted on the abscissa and the proportion in mole% of a glycol component having at least 3 carbon atoms in the polyhydric alcohols, on the ordinate.

An oil-free polyester having a composition outside the above-specified range has poor compatibility with other resins to be combined therewith, especially an acrylic resin, and cannot be used for the purpose of the invention.

The alkyd resin (B) used in the invention can be produced by the same method as that used to produce ordinary alkyd resins. The raw materials used in the production of the oil-free polyester and other various natural and synthetic fatty acids and their glycerides are used as raw materials for the alkyd resin (B). Cardura E-10 (a tradename for a product of Shell Chemical Co.), and $\alpha$-olefin epoxides can also be used as an alcohol component. There is no particular restriction on the use of fatty acids and their glycerides for the modification of alkyd resins. Since, however, fatty acids and their glycerides having a high iodine value tend to degrade weatherability of the coated film, those having a low iodine value of less than about 12 are preferably used. The proportions of the starting components used in the production of the alkyd resin are adjusted so that the resulting alkyd resin has an oil length of 15 to 50%, preferably 20 to 45%, and a hydroxyl value of 40 to 200, preferably 50 to 160.

The hydroxyl-containing acrylic finish (C) used in this invention is obtained by copolymerizing a hydroxyl-containing acrylic monomer with a radical-polymerizable unsaturated monomer in a customary manner.

Examples of the hydroxyl-containing acrylic monomer include $C_{2-8}$ hydroxyalkyl esters of acrylic or methacrylic acid such as hydroxyethyl acrylate, hydroxyethyl methacrylate, hydroxypropyl acrylate and hydroxypropyl methacrylate. These acrylic monomers may be used singly or in combination of two or more.

Any compounds having a radical-polymerizable ethylenic unsaturated bond ($>C=C<$) can be used as the radical-polymerizable unsaturated monomer copolymerizable with the hydroxyl-containing acrylic monomer. It can be selected broadly from such compounds according to the desired property of the final acrylic resin.

Typical examples of the radical-polymerizable unsaturated monomer are shown below.

(A) Esters of acrylic or methacrylic acid;

$C_{1-18}$ alkyl or cycloalkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; alkoxyalkyl esters of acrylic or methacrylic acid, such as methoxybutyl acrylate, methoxybutyl methacrylate, methoxyethyl acrylate, methoxyethyl methacrylate, ethoxybutyl acrylate and ethoxybutyl methacrylate; adducts of glycidyl acrylate or methacrylate with $C_{2-18}$ monocarboxylic acid compounds (e.g., acetic acid, propionic acid, oleic acid, stearic acid, lauric acid, or p-t-butylbenzoic acid); and adducts of Cardura E-10 with unsaturated acids such as acrylic acid and methacrylic acid.

(B) Vinyl aromatic compounds;

Styrene, $\alpha$-methylstyrene, vinyltoluene, p-chlorostyrene, and vinylpyridine.

(C) $\alpha,\beta$-Ethylenically unsaturated carboxylic acids;

Acrylic acid, methacrylic acid, crotonic acid, itaconic acid, maleic acid, maleic anhydride, fumaric acid, an adduct of hydroxyethyl (meth)acrylate with phthalic anhydride and an adduct of hydroxypropyl (meth)acrylate with phthalic anhydride.

(D) Glycidyl group-containing vinyl monomers;

Glycidyl acrylate, glycidyl methacrylate and allyl glycidyl ether.

(E) Acrylic or methacrylic acid amides;

Acrylamide, N-methylol acrylamide and N-butoxymethyl acrylamide.

(F) Ethylenically unsaturated monomers containing an alkoxysilane group;

$\gamma$-Methacryloxytrimethoxysilane.

(G) Other unsaturated monomers;

Acrylonitrile, methacrylonitrile, dimethyl amino ethyl methacrylate, diethyl amino ethyl methacrylate, dimethyl amino methyl acrylate and diethyl amino ethyl acrylate.

These unsaturated monomers are selected according to the desired properties of the final product, and may be used singly or in combination of two or more.

The copolymerization of the hydroxyl-containing acrylic monomer with the radical-polymerizable unsaturated monomer can be carried out, for example, by a solution polymerization method, an emulsion polymerization method, or a suspension polymerization method in accordance with a known process for producing acrylic copolymers. Advantageously, it is carried out by the solution polymerization method. Generally, the polymerization is carried out in a suitable solvent for the aforesaid two components in the presence of a polymerization catalyst at a temperature of usually about 0° to about 180° C., preferably about 40° to about 170° C., for a period of about 1 to about 20 hours, preferably about 4 to about 10 hours.

The polymerization catalyst used may be ordinary radical initiators for radical polymerization, such as azo compounds, peroxide compounds, sulfides, sulfines, diazo compounds, nitroso compounds and redox systems.

The hydroxyl-containing acrylic resin so obtained should desirably have a hydroxyl value of 20 to 200, preferably 35 to 150, and a number average molecular weight of 1,000 to 30,000, preferably 2,000 to 20,000. When the water resistance and chemical resistance of the resulting acrylic resin are important, it is prepared by including 10 to 50% by weight, preferably 15 to 40% by weight, of styrene in the starting monomer components. If the amount of styrene is less than 10% by weight, the above properties cannot be obtained, and if it exceeds 50% by weight, the weatherability of the acrylic resin is degraded.

In obtaining the acrylic resin, it is desirable to adjust the amount of the hydroxyl-containing acrylic monomer so that the hydroxyl value of the final acrylic resin is within the above-specified range, and to adjust the reaction conditions in advance so that the number average molecular weight of the final acrylic resin is within the above-specified range. invention is an aminoaldehyde resin and/or a blocked isocyanate. The aminoaldehyde resin contains melamine, urea, benzoguanamine, acetoguanamine, steroguanamine, spiroguanamine, etc. as an amino component. Most of aminoaldehyde resins used ordinarily in paints can be used in this invention. Melamine/formaldehyde resin is especially preferred from the standpoint of weatherability.

The blocked polyisocyanate is obtained by blocking non-yellowing polyisocyanates such as isophorone diisocyanate, hexamethylene diisocyanate, lysine diisocyanate, or dicyclohexylmethane-4,4'-diisocyanate with conventional blocking agents such as aliphatic or aromatic monoalcohol (e.g. methanol, ethanol, butanol, hexanol, cyclohexanol, benzyl alcohol; etc.), oximes (e.g. acetoxime, methyl ethyl ketone oxime, etc.), lactams (e.g. 8-caprolactam, etc.) and phenols. They include, for example, Takenate B-815 (a tradename for a product of Takeda Chemical Co., Ltd.), Takenate B-840N (a tradename for a product of Takeda Chemical Co., Ltd.), Adduct B1065 (a tradename for a product of Veba Chemie), and ADDITOL VXL-80 (a tradename for a product of Hoechst Japan Co., Ltd.). When these blocked polyisocyanates are used, a catalyst capable of inducing liberation of the blocking agent may be used as required.

The oil-free polyester used in this invention has excellent weatherability, waxing resistance, mechanical properties (flexibility), adhesion to a primer, interlayer adhesion and surface appearance. But its solvent resistance and water resistance tend to be somewhat poor. The dispersibility of a pigment in the oil-free polyester is fairly good, but is generally inferior to that in an alkyd resin. The alkyd resin and the acrylic resin used in this invention serve to remedy the aforesaid defects of the oil-free polyester and impart excellent coatability to the resulting coating composition (namely, to render the coating composition resistant to popping and sagging and easy to coat). For this purpose, the alkyd resin should have an oil length of 15 to 50% and a hydroxyl value of 40 to 200. Otherwise, it is impossible to fully remedy the defects of the oil-free polyester.

On the other hand, the acrylic resin used in the invention serves to impart weatherability, water resistance and chemical resistance to the resulting coating composition. For this purpose, the acrylic resin preferably has a number average molecular weight of 1,000 to 30,000 and a hydroxyl value of 20 to 200. Furthermore, when water resistance and chemical resistance are of especial importance, styrene is included in an amount of 10 to 50% by weight based on the entire monomers forming the acrylic resin.

The heat-curable coating composition of this invention mainly exhibits the properties of the oil-free polyester (A) with its insufficient properties being compensated for by the alkyd resin (B) and the acrylic resin (C). The mixing proportions of the three types of resins and the crosslinking agent (D), in view of their respective roles, are preferably 15 to 60% by weight for the component (A), 5 to 40% by weight for the component (B), 5 to 40% by weight for the component (C), and 10 to 40% by weight for the component (D), based on the total weight of the binder.

As required, the heat-curable coating composition of the invention may further include additives such as a surface adjusting agent, a cure promoting catalyst, a cissing inhibitor, an ultraviolet absorber, an antioxidant, or a quencher.

The coating composition of the invention so obtained is excellent in weatherability, waxing resistance, chemical resistance (acid resistance), ease of coating, film surface appearance, flexibility, water resistance, adhesion to a primer, interlayer adhesion, and pigment dispersibility. It is especially suitable as a solid color top coat for automotive bodies.

In order to coat an automotive body with the coating composition of this invention, a binder composed of the oil-free polyester (A), the alkyd resin (B), the acrylic resin (C) and the crosslinking agent (D) is first blended with a conventional colored pigment and if required, additives in a customary manner to form a coating composition which is then adjusted to a coating viscosity of 20 to 30 seconds in Ford cup No. 4 (20° C.) by using a diluting solvent. The resulting coating composition is then applied to a dry film thickness of about 30 to 40 microns to a substrate on which a primer and an intermediate coat have been formed. The coating is carried out in a usual manner by air spray, airless spray, electrostatic coating, etc. Then, the coated article is left to stand at room temperature for several minutes, and heated at 140° to 150° C. for 20 to 40 minutes to give a top coat intended by this invention.

The following examples illustrate the present invention more specifically. In these examples, all parts and percentages are by weight unless otherwise indicated.

[I] Production of varnishes (1) Production of an oil-free polyester varnish A

A reaction vessel for polyester production equipped with a heating service, a stirrer, a refluxing device, a water separator, a rectifying column and a thermometer was charged with 92.4 parts (0.6 mole) of hexahydrophthalic anhydride, 34.0 parts (0.23 mole) of phthalic anhydride, 19.0 parts (0.13 mole) of adipic acid, 85.3 parts (0.82 mole) of neopentyl glycol and 24.1 parts (0.18 mole) of trimethylolpropane, and these materials were heated. When the raw materials were melted and became stirrable, stirring of the molten mixture was started. The temperature of the reactor was raised to 230° C. from 160° C. at a uniform rate over the course of 3 hours. The water of condensation formed was removed out of the reaction system through the rectifying column. When the temperature reached 230° C., it was maintained constant, and the stirring of the mixture was continued for 2 hours. Then, xylene was added to the reactor, and the reaction was continued by a solvent condensation method. When the acid value of the reaction mixture reached 7, the reaction was terminated, and the reaction mixture was cooled. After the cooling, 145 parts of xylene was added to prepare an oil-free polyester varnish A having a solids content of 60%. This varnish had a viscosity of P (Gardner viscosity at 25° C.) and a resin acid value of 7.1.

(2) Production of an oil-free polyester varnish B

An oil-free polyester varnish B was produced from the following starting materials in the same way as in the production of the oil-free polyester varnish A.

|  | Parts | Mole |
| --- | --- | --- |
| Hexahydrophthalic anhydride | 61.6 | 0.4 |
| Isophthalic acid | 49.8 | 0.3 |
| Adipic acid | 27.7 | 0.19 |
| Neopentyl glycol | 74.9 | 0.72 |
| Trimethylolpropane | 37.5 | 0.28 |

The resulting oil-free polyester varnish B had a solids content of 60%, a viscosity of M (Gardner viscosity of 25° C.) and a resin acid value of 7.2.

(3) Production of an oil-free polyester varnish C

An oil-free polyester varnish C was produced from the following starting materials in the same way as in the production of the oil-free polyester varnish A.

|  | Parts | Mole |
| --- | --- | --- |
| Isophthalic acid | 106.2 | 0.64 |
| Adipic acid | 43.8 | 0.3 |
| Neopentyl glycol | 85.3 | 0.82 |
| Trimethylolpropane | 24.1 | 0.18 |

The resulting oil-free polyester varnish C had a solids content of 60%, a viscosity of V (Gardner viscosity at 25° C.), and a resin acid value of 6.9. This oil-free polyester varnish is used for comparison.

(4) Production of an alkyd resin varnish A

An alkyd resin varnish A was produced from the following starting materials in the same way as in the production of the oil-free polyester varnish A.

|  | Parts | Mole |
| --- | --- | --- |
| Phthalic anhydride | 148 | 1.0 |
| Trimethylolpropane | 134 | 1.0 |
| Coconut oil fatty acid | 105 | 0.5 |

The resulting alkyd resin varnish A had a solids content of 60%, a viscosity of WX (Gardner viscosity at 25° C.), and a resin acid value of 7.3. The resin portion of the alkyd resin varnish A had a hydroxyl value of 85 and an oil length of 31%.

(5) Production of an alkyd resin varnish B

An alkyd resin varnish B was produced from the following starting materials in the same way as in the production of the oil-free polyester varnish A.

|  | Parts | Mole |
| --- | --- | --- |
| Phthalic acid | 132 | 0.89 |
| Pentaerythritol | 58 | 0.42 |
| Trimethylolpropane | 78 | 0.58 |
| Iso-nonanoic acid | 142 | 0.90 |

The resulting alkyd resin varnish B had a solids content of 60%, a viscosity of R (Gardner viscosity at 25° C.) and a resin acid value of 5.8. The resin portion of the alkyd resin varnish B had a hydroxyl value of 115 and an oil length of 41%.

(6) Production of an acrylic resin varnish A

A reaction vessel for production of acrylic resin varnishes equipped with a stirrer, a monomer dropping tank, a heating or cooling device, etc., was charged with 67 parts of xylene and heated to 112° C. This temperature (112° C.) was maintained until the end of the reaction.

A monomer mixture consisting of 15 parts of styrene, 38 parts of methyl methacrylate, 30 parts of n-butyl acrylate, 15 parts of 2-hydroxyethyl methacrylate, 2 parts of acrylic acid and 1.3 parts of 2,2'-azobisisobutyronitrile was added dropwise at a uniform rate over the course of 4 hours. One hour after the addition, 0.5 part of 2,2'-azobisisobutyronitrile was added over the course of 1 hour at 10 minute' intervals using one-sixth of the total amount each time. Then, the mixture was stirred for 1 hour at 112° C., and the reaction was terminated. The reaction mixture was cooled, and then 17 parts of xylene and 15 parts of n-butanol were added to give an acrylic resin varnish A having a solids content of 50%.

The resin portion of the acrylic resin varnish A had a number average molecular weight (measured by GPC) of 9,800, and a hydroxyl value of 65.

(7) Production of an acrylic resin varnish B

An acrylic resin varnish B having the following monomer composition was produced in the same way as in the production of the acrylic resin varnish A except that the reaction temperature and the amount of 2,2'-azobisisobutyronitrile were changed.

| Monomers | Parts |
| --- | --- |
| Styrene | 35 |
| Methyl methacrylate | 10 |
| n-Butyl acrylate | 20 |
| 2-Ethylhexyl acrylate | 13 |
| 2-Hydroxyethyl methacrylate | 20 |
| Acrylic acid | 2 |

The resin portion of the acrylic resin varnish B had a number average molecular weight of 7,200 (measured by GPC) and a hydroxyl value of 86.

[II] Preparation of a coating substrate

An epoxy-type cationic electrodeposition paint was coated on a dull steel panel treated with zinc phosphate so as to provide a dry film thickness of 20 microns, and baked at 170° C. for 20 minutes. The coated surface was then polished with #400 sand paper, and degreased with a gauze wetted with petroleum benzin.

An automotive intermediate coating paint of the aminoalkyd type was coated on the degreased surface so as to provide a dry film thickness of 30 microns, and baked at 140° C. for 30 minutes.

The coated surface was wet-sanded with #400 sand paper, dried and wiped with petroleum benzin to form a substrate for use in the following examples.

EXAMPLES 1 to 5 AND COMPARATIVE EXAMPLES 1 AND 2

By using the alkyd resin varnish A, a white top coating composition of the following formulation was prepared by dispersing the components in a pebble ball mill.

| Components | Parts |
|---|---|
| 60% oil-free polyester varnish A | 66.6 |
| 60% alkyd resin varnish A | 33.3 |
| 60% acrylic resin varnish A | 20 |
| 60% Uban 20SE (*1) | 30 |
| Titanium white JR-602 (*2) | 80 |

Note
(*1): a melamine resin made by Mitsui Toatsu Chemicals, Inc.
(*2): Titanium white made by Teikoku Kako K.K.

The pigment was dispersed by adding a suitable amount of xylene and using the alkyd resin varnish A. As a paint film surface adjusting agent, 40 ppm, based on the entire coating composition, of Silicone Oil KP-322 (a product of Shin-etsu Chemical Co., Ltd.) was added.

The resulting coating composition was diluted to a viscosity of 26 seconds (Ford cup #4/20° C.) with a mixed solvent consisting of Swasol #1500 (a petroleum-type solvent made by Maruzen Oil Co., Ltd.), xylene, butyl acetate and n-butanol in a ratio of 30:20:30:20.

The diluted coating composition was air-sprayed onto the surface of the substrate so as to provide a dry film thickness of 35 microns, set at room temperature for 10 minutes, and baked in an electric hot air oven at 140° C. for 30 minutes.

The coated steel panel was tested, and the results are shown in Table 2.

The method of pigment dispersion, the use of a paint surface adjusting agent and the method of preparing a coated panel for testing in Examples 2 to 5 and Comparative Examples 1 and 2 were the same as in Example 1.

Table 1 shows the paint formulation used in Examples 1 to 5 and Comparative Examples 1 and 2, and the test results obtained in these examples are shown in Table 2.

TABLE 1

| Example 1 | | |
|---|---|---|
| 60% oil-free polyester varnish A | 66.6 | parts |
| 60% alkyd resin varnish A | 33.3 | |
| 50% acrylic resin varnish A | 20 | |
| 60% Uban 20SE | 30 | |
| Titanium white JR-602 | 80 | |
| Example 2 | | |
| 60% oil-free polyester varnish A | 66.6 | parts |
| 60% alkyd resin varnish B | 25 | |
| 50% acrylic resin varnish A | 50 | |
| 60% Uban 20SE | 50 | |
| Phthalocyanine Green 6YS (a green organic pigment made by ICI Co., Ltd.) | 15 | |
| Example 3 | | |
| 60% oil-free polyester varnish A | 50 | parts |
| 60% alkyd resin varnish A | 33.3 | |
| 50% acrylic resin varnish B | 40 | |
| 60% Uban 20SE | 50 | |
| Paliogen Red 3910 (a red organic pigment made by BASF Co., Ltd.) | 15 | |
| Example 4 | | |
| 60% oil-free polyester varnish B | 50 | parts |
| 60% alkyd resin varnish A | 33.3 | |
| 50% acrylic resin varnish A | 40 | |
| 60% Uban 20SE | 50 | parts |
| Titanium white JR-602 | 80 | |
| Example 5 | | |
| 60% oil-free polyester varnish B | 50 | parts |
| 60% alkyd resin varnish B | 33.3 | |
| 50% acrylic resin varnish B | 40 | |
| 60% Uban 20SE | 30 | |
| Titanium white JR-602 | 80 | |
| Comparative Example 1 | | |
| 60% alkyd resin varnish A | 116.6 | parts |
| 60% Uban 20SE | 50 | |
| Phthalocyanine Green 6YS | 15 | |
| Comparative Example 2 | | |
| 60% oil-free polyester varnish C | 50 | parts |
| 60% alkyd resin varnish A | 33.3 | |
| 50% acrylic resin varnish A | 40 | |
| 60% Uban 20SE | 50 | |
| Titanium white JR-602 | 80 | |

TABLE 2

| Properties of the coated film | Ex. 1 | Ex. 2 | Ex. 3 | Ex. 4 | Ex. 5 | CEx. 1 | CEx. 2 |
|---|---|---|---|---|---|---|---|
| Compatibility (*1) | Good | Good | Good | Good | Good | Good | Poor |
| Appearance (*2) | ◎ | ◎ | ◎ | ◎ | ◎ | ◎ | X |
| 60° specular reflectance (%) | 93 | 93 | 92 | 93 | 93 | 92 | 62 |
| Pencil hardness | HB | HB | HB | HB | HB | HB | HB |
| Erichsen value (mm) | 5.8 | 6.2 | 6.0 | 5.9 | 6.1 | 4.1 | 4.3 |
| Impact strength (cm; Du Pont type $\phi = \frac{1}{2}''$, 500 g) | 50 | 50 | 50 | 50 | 50 | 50 | 50 |
| Acid resistance (*3) | No change | No change | No change | No change | No change | No change | — |
| Resistance to wiping with gasoline (*4) | Good | Good | Good | Good | Good | Good | — |
| Water resistance (*5) | Good | Good | Good | Good | Good | Good | — |
| Interlayer adhesion (*6) | Good | Good | Good | Good | Good | Poor | — |
| Coatability (*7) | Good | Good | Good | Good | Good | Good | — |
| Waxing resistance before exposure (*8) | ○ | ○ | ○ | ○ | ○ | △ | — |
| Waxing resistance (S.W.O.M., 400 hrs later) (*8) | ○ | ○ | ○ | ○ | ○ | X | — |

TABLE 2-continued

| Properties of the coated film | Example (Ex.) or Comparative Example (CEx.) | | | | | | |
|---|---|---|---|---|---|---|---|
| | Ex. 1 | Ex. 2 | Ex. 3 | Ex. 4 | Ex. 5 | CEx. 1 | CEx. 2 |
| Weatherability (*9) | 70 | 82 | 80 | 72 | 70 | 26 | — |

Note to Table 2
(*1): Compatibilty
The individual varnishes excepting crosslinking agent were coated on a glass plate by an applicator, and the transparency and surface appearance of the coated wet film were observed. The condition of the coated film was also observed after drying the wet film at 140° C. for 30 minutes. Then, the crosslinking agent was added, and the same operation as above was repeated. When the coated surface had transparency and good smoothness in any of the conditions tested, the compatibility of the binder components was rated "good".
(*2): Surface appearance
The appearance of the coated film was evaluated on the following standard from the standpoint of gloss and high build.
⊙: Very good
○: Good
Ⓐ: Fairly good
Δ: Poor
X: Very poor
(*3): Acid resistance
0.5 cc of 10% sulfuric acid was dropped onto the coated film surface. On standing for 48 hours at 20° C. and RH 75%, the film surface was washed with water and observed.
(*4): Resistance to wiping with gasoline
A gauze was wetted with Nisseki Silver Gasoline, and rubbed strongly against the coated film surface through 8 reciprocations over a distance of 10 cm. Then, the film surface was observed. When the rubbed film surface was substantially free from scratch and hazy gloss, it was judged that the paint film had good resistance to gasoline.
(*5): Water resistance
The test specimen was dipped for 240 hours in water in a tank kept constantly at 40° C. The specimen was taken out and observed for changes in the coated film. When the coated film was free from gloss disappearance and blister formation, the specimen was evaluated as having good water resistance.
(*6): Interlayer adhesion
The top coated and baked test panel was overbaked at 160° C. for 30 minutes, and allowed to cool at room temperature. Two hours later, the same kind of coating composition prepared was coated, baked at 140° C. for 30 minutes and allowed to cool. Then, the panel was subjected to a crosscut cellophane tape peel test. When no peeling occurred, the test panel was evaluated as having good interlayer adhesion.
(*7): Coatability
A diluted coating composition prepared was airsprayed, and the popping and sagging phenomena were comprehensively evaluated.
(*8): Resistance to waxing
A small amount of an automobile wax (Soft 99, half-kneaded; a product of Nitto Chemical Co., Ltd.) was applied to a white flannel cloth. Using the index finger, the flannel cloth was strongly rubbed against the coated film surface through 10 reciprocations over a distance of 10 cm. Then, the wax remaining on the film surface was wiped off with a new white flannel cloth, and the film surface was observed. The hazy gloss and scratch of the film surface and the degree of adhesion of the coated color to the white flannel cloth were comprehensively evaluated on the following scale.
⊙: No hazy gloss and scratch of the film surface, and no coloration of the flannel.
○: Scarcely any hazy gloss and scratch of the film surface and scarcely any coloration of the flannel.
Ⓐ: Slight hazy gloss and scratch of the film surface, and slight adhesion of the coated color to the flannel (limit of practical application).
Δ: Considerable hazy gloss and scratch of the film surface, and considerable coloration of the flannel.
X: Remarkable hazy gloss and scratch of the film surface, and remarkable coloration of the flannel.
(*9): Weatherability
By using a QUV (a product of Q-Panel Company) tester, the test specimen was exposed to ultraviolet irradiation at 60° C. for 16 hours and then condensed at 50° C. for 8 hours. This cycle was performed for 400 hours, and then the 60° specular reflectance (%) of the specimen was measured.

Examples 1 to 5 examples in accordance with this invention. The coating compositions used in these examples exhibited excellent properties in the various tests as a top coat paint (especially for top coating of an automotive body). Since the dispersibility of a pigment was excellent and the compatibility of the varnishes with each other was good, there was scarcely any change in the properties of the coating composition upon storage. Even when the coating composition was used after storage, the resulting coated film exhibited good finish appearance and properties the same as in the case of using the coating composition before storage.

Comparative Example 1 used an alkyd resin varnish having a short oil length. The interlayer adhesion, waxing resistance and weatherability (gloss retention) of the coated film were poor.

In Comparative Example 2, the oil-free polyester varnish C was used. Since the compatibility with the other paint varnishes was poor, the coated film had poor appearance and suffered from the loss of gloss. Thus, the coating composition was unsuitable for top coating. Since the appearance of the coated film was very poor, the testing of its acid resistance and other properties was omitted as shown in Table 2.

The results given in these examples demonstrate the very good properties of the coating composition of this invention.

What we claim is:

1. A heat-curable coating composition comprising, as a binder, a composition consisting of
   (A) 15 to 60% by weight of an oil-free polyester in which at least 30 mole% of the acid component consists of a saturated alicyclic polybasic acid, said polyester having a composition on or within the four sides of a tetragon defined by the four points of (0.8, 60), (0.8, 100), (1.00, 70) and (1.00, 100), on coordinates in which the abscissa represents the molar ratio of the polybasic acid component to the polyhydric alcohol component of the polyester (dibasic acid ratio), and the ordinate represents the proportion in mole% of a glycol having at least 3 carbon atoms in the polyhydric alcohol component,
   (B) 5 to 40% by weight of an alkyd resin having an oil length of 15 to 50% and a hydroxyl value of 40 to 200,
   (C) 5 to 40% by weight of a hydroxyl-containing acrylic resin having a hydroxyl value of 20 to 200 and a number average molecular weight of 1,000 to 30,000, and (D) 10 to 40% by weight of a crosslinking agent, said weight percentages being based on the total weight of the binder.

2. The composition of claim 1 wherein the saturated alicyclic polybasic acid is hexahydrophthalic acid or its anhydride, methylhexahydrophthalic acid or its anhydride, hexahydrotrimellitic acid or its anhydride, or hexahydro-2-methyltrimellitic acid or its anhydride.

3. The composition of claim 1 wherein the remainder of the acid component is an aromatic polybasic acid, a saturated dibasic acid of the formula $HOOC(CH_2)_nCOOH$ in which n is an integer of 1 to 12, or an unsaturated polybasic acid.

4. The composition of claim 1 wherein the alkyd resin (B) has an oil length of 20 to 45% and a hydroxyl value of 50 to 160.

5. The composition of claim 1 wherein the hydroxyl-containing acrylic resin (C) has a hydroxyl value of 35 to 150 and a number average molecular weight of 2,000 to 20,000.

6. The composition of claim 1 wherein the acrylic resin (C) contains 10 to 50% by weight, based on the entire constituent monomers, of styrene.

7. The composition of claim 1 wherein the crosslinking agent (D) is an aminoaldehyde resin and/or a blocked isocyanate.

8. The composition of claim 7 wherein the aminoaldehyde resin is melamine/formaldehyde resin.

9. The composition of claim 7 wherein the blocked isocyanate is a blocked product of isophorone diisocyanate, hexamethylene diisocyanate, lysine diisocyanate or dicyclohexylmethane-4,4'-diisocyanate.

* * * * *